US006928162B1

(12) United States Patent
Heddes et al.

(10) Patent No.: US 6,928,162 B1
(45) Date of Patent: Aug. 9, 2005

(54) METHOD AND SYSTEM FOR MANIPULATING AND TELESCOPING A HASH FUNCTION

(75) Inventors: Marco C. Heddes, Raleigh, NC (US); Clark Debs Jeffries, Durham, NC (US); Piyush Chunilal Patel, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/543,674

(22) Filed: Apr. 7, 2000

(51) Int. Cl.[7] ................................................ H04L 9/28
(52) U.S. Cl. ........................ 380/28; 380/209; 380/46; 380/59; 380/217; 713/154; 713/164; 713/167; 713/194; 713/190; 370/392
(58) Field of Search .............................. 380/28, 46, 59, 380/217, 209; 713/154, 162, 167, 194, 190, 164; 370/392

(56) References Cited

U.S. PATENT DOCUMENTS

| 5,623,545 | A | | 4/1997 | Childs et al. |
| 5,757,795 | A | * | 5/1998 | Schnell ........................ 370/392 |
| 5,802,525 | A | * | 9/1998 | Rigoutsos ............... 707/103 R |

(Continued)

FOREIGN PATENT DOCUMENTS

| EP | 822720 A1 | 2/1998 |
| EP | 849713 A1 | 6/1998 |
| EP | 886399 A2 | 12/1998 |
| EP | 905967 A1 | 3/1999 |
| WO | WO9914881 | 3/1999 |

OTHER PUBLICATIONS

Debis et al., "Using Self–Organizing Maps to Learn Geometric Hash Functions for Model–Based Objct Recognition", IEEE Transactions On Neural Networks, vol. 9, No. 3, May 1998.*

(Continued)

Primary Examiner—Gregory Morse
Assistant Examiner—Tongoc Tran
(74) Attorney, Agent, or Firm—Sawyer Law Group LLP

(57) ABSTRACT

A method and system for providing a hash and a complement of the hash for an item in a computer system are disclosed. The method and system include providing a plurality of components from the item. The plurality of components include a first component and a last component. Each of the plurality of components includes a particular number of bits. The method and system also include cascading the plurality of components through at least one XOR to provide a plurality of resultants. The plurality of resultants includes a first resultant and a final resultant. The final resultant includes only the last component. The first resultant includes an XOR of the first component and remaining cascaded components of the plurality of components. The method and system also include applying an invertible hash function and an invertible hash function complement to at least the first resultant to provide the hash. The complement of the hash includes the plurality of resultants except the first resultant. In another aspect, the method and system include applying the invertible hash function and its complement to at least the first component of the plurality of components, before the plurality of components are cascaded through the at least one XOR. In this aspect, the hash includes the first resultant. The complement of the hash includes the plurality of resultants except the first resultant.

42 Claims, 9 Drawing Sheets

U.S. PATENT DOCUMENTS

| | | | | | |
|---|---|---|---|---|---|
| 5,852,607 | A | * | 12/1998 | Chin | 370/401 |
| 5,889,868 | A | | 3/1999 | Moskowitz et al. | |
| 5,978,951 | A | * | 11/1999 | Lawler et al. | 714/758 |
| 6,014,733 | A | * | 1/2000 | Bennett | 711/216 |
| 6,047,362 | A | * | 4/2000 | Zucker | 711/203 |
| 6,185,208 | B1 | * | 2/2001 | Liao | 370/392 |
| 6,230,231 | B1 | * | 5/2001 | DeLong et al. | 711/3 |
| 6,424,650 | B1 | * | 7/2002 | Yang et al. | 370/390 |
| 6,463,537 | B1 | * | 10/2002 | Tello | 713/182 |
| 6,654,796 | B1 | * | 11/2003 | Slater et al. | 709/220 |
| 6,675,163 | B1 | * | 1/2004 | Bass et al. | 707/6 |

OTHER PUBLICATIONS

Bruce Schneier, "Applied Crytpgraphy, Protocols, Algorithms, and Source Code in C", 1996, John Wiley & Sons, Inc. Second Edition, p. 237.*

Craig Hunt, "TCP/IP Network Adminstration", 1998, O'Reilly & Associates, Inc., Second Edition, p. 13.*

Raj Jain, "A Comarison of Hashing Schemes for Address Lookup in Computer Networks", 1992, IEEE Transactions on Communication, vol. 40, No. 10, p. 1570–1573.*

* cited by examiner

# METHOD AND SYSTEM FOR MANIPULATING AND TELESCOPING A HASH FUNCTION

CROSS-REFERENCE TO RELATED APPLICATIONS

The present invention is related to U.S. patent application Ser. No. 09/210,222 now U.S. Pat. No. 6,785,278 and entitled "SYSTEM, METHOD AND COMPUTER PROGRAM PRODUCTS FOR HASHING ADDRESS VALUES" (RA9-98-056) and assigned to the assignee of the present invention.

FIELD OF THE INVENTION

The present invention relates to computer systems, and more particularly to a method and system for allowing an invertible hash function to be extended to components having a greater number of bits.

BACKGROUND OF THE INVENTION

Hash functions are used throughout computer networks for many purposes. For example, in routing traffic between networks or through a particular network, the source and destination addresses of particular packets are utilized to determine how to route the packet. Similarly, when packets are transmitted through components of a network, such as a switch, all or part of the IP five-tuple (the source address, the destination address, the source port, the destination port and the protocol) may be used to classify the packet. Items, such as the IP five-tuple or the address of a packet, are often several bits to hundreds of bits in length. For example, the IP address is typically thirty-two bits, while the IP five-tuple is typically one hundred and four bits in length. In order to improve the time taken to perform operations using these items and thus improve the efficiency of the network, a hash function is typically used. The hash of the item is shorter than the item and can be used to identify the item. For example, a thirty-two bit address may be hashed to sixteen bits. This sixteen bit hash is then used by the network to identify the address and perform operations on the corresponding hash. Because the hash is short-hand, nickname for the item, these operations can typically be performed more rapidly, improving the efficiency of the network.

Although use of a hash improves the performance of the network, one of ordinary skill in the art will readily realize that there are problems inherent in using a hash. In particular, a hash function may map multiple items to the same hash. This phenomenon is known as a collision. When there is a collision, the item to which the hash corresponds must be capable of being uniquely determined. Typically, hash functions are not invertible. Thus, it generally cannot be determined from the hash to which of the items that collided the hash corresponds. In order to resolve the collision, therefore, the conventional network must search for original item. Such a search is time consuming and degrades performance of the network.

Furthermore, as discussed above, it may be desirable to employ a hash function on many different kinds of items having different lengths. For example, a hash for the source address for a particular packet as well as a hash for the IP five-tuple for the particular packet may be desired. In order to simplify the network, it would also be desirable for similar hash functions to be capable of providing hashes for items of different lengths.

Accordingly, what is needed is a system and method for providing a hash function which allows collisions to be more easily resolved and which can be telescoped, or expanded, so that the hash function can be used with items of different lengths. The present invention addresses such a need.

SUMMARY OF THE INVENTION

The present invention provides a method and system for providing a hash and a complement of the hash for an item in a computer system. The method and system comprise providing a plurality of components from the item. The plurality of components includes a first component and a last component. Each of the plurality of components includes a particular number of bits. In one aspect, the method and system comprise cascading the plurality of components through at least one XOR to provide a plurality of resultants. The plurality of resultants includes a first resultant and a final resultant. The final resultant includes only the last component. The first resultant includes an XOR of the first component and remaining cascaded components of the plurality of components. The method and system also comprise applying an invertible hash function and an invertible hash function complement to at least the first resultant to provide the hash. The complement of the hash includes the plurality of resultants except the first resultant. In another aspect, the method and system comprise applying the invertible hash function and its complement to at least the first component of the plurality of components, before the plurality of components are cascaded through the at least one XOR. In this aspect, the hash includes the first resultant. The complement of the hash includes the plurality of resultants except the first resultant.

According to the system and method disclosed herein, the present invention provides an invertible hash that can be extended to items having larger numbers of bits.

DETAILED DESCRIPTION OF THE INVENTION

The present invention relates to an improvement in computer systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1A:
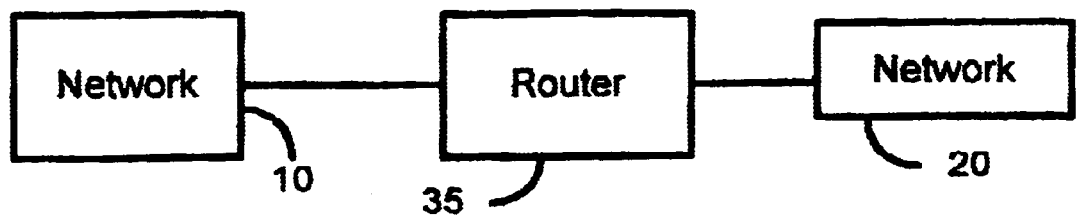
FIG. 1A is a block diagram of computer networks in which the present invention can be used.

FIG. 1A is a high-level block diagram of networks 10 and 20 and a router 35, which may be used to route traffic between network 10 and network 20. The router 35 may use a hash function in accordance with the present invention in order to determine the source and/or destination of individual packets being routed between the networks 10 and 20. For example, the router 35 may use the hash function in accordance with the present invention on addresses, such as the source address and destination address, for a particular packet.

Figure 1B:
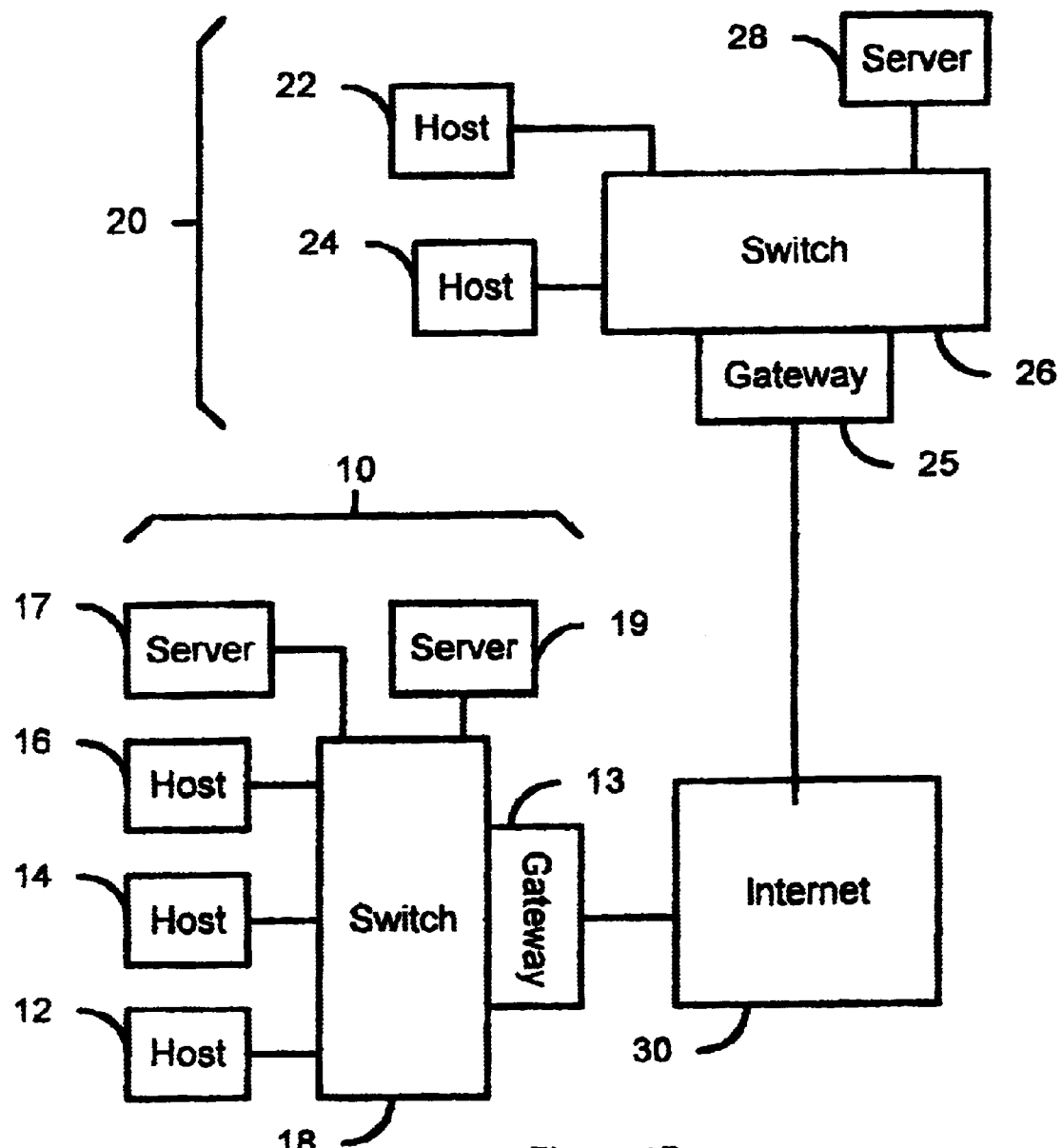
FIG. 1B is a more detailed block diagram of computer networks in which the present invention can be used.

FIG. 1B depicts a more detailed block diagram of the networks 10 and 20. In FIG. 1B, the networks 10 and 20 are depicted as being coupled through the Internet 30. The router 35 thus may be considered to be part of the Internet 30. The networks 10 and 20 might also use the hash function in accordance with the present invention in the switches 18 and 26, respectively. For example, the hash function in accordance with the present invention might be applied to an IP five-tuple. The resulting hash and its complement, discussed below, might then be used in functions such as classification and transmission of the packet through the switches 18 and 26. However, the present invention is not limited to use in the components depicted in FIGS. 1A and 1B.

Co-pending U.S. patent application Ser. No. 09/210,222, and entitled "SYSTEM, METHOD AND COMPUTER PROGRAM PRODUCTS FOR HASHING ADDRESS VALUES" (RAL9-98-056) and assigned to the assignee of the present invention also describes a hash function. Applicants hereby incorporate by reference the above-mentioned co-pending patent application. The hash function described in the above-mentioned co-pending application is an invertible, geometric hash function for use with an item having a particular number of bits, preferably thirty-two bits. The hash function provides a hash and its complement. In the preferred embodiment described in the above-mentioned co-pending application, the hash is sixteen bits and the complement is sixteen bits.

The hash and the complement together correspond uniquely to a particular item that is hashed. Thus, the hash function is invertible. In particular, the hash function ensures that if a collision does occur in the sixteen bit hash, then no collisions will occur in the complement. Thus, a search of the original item does not need to be commenced if there is a collision in the hash. Instead, the complement can be accessed and the collision resolved through the use of the complement. The hash function is considered to be geometric because the hash function can be considered to fold in a particular way lines in a scatter plot representing the item. The hash function also preferably exploits statistical properties of items being hashed so that fewer collisions occur in the sixteen bit hash. Thus, not only can collisions be resolved using the hash and its complement, but fewer collisions occur in the hash.

Figure 2:
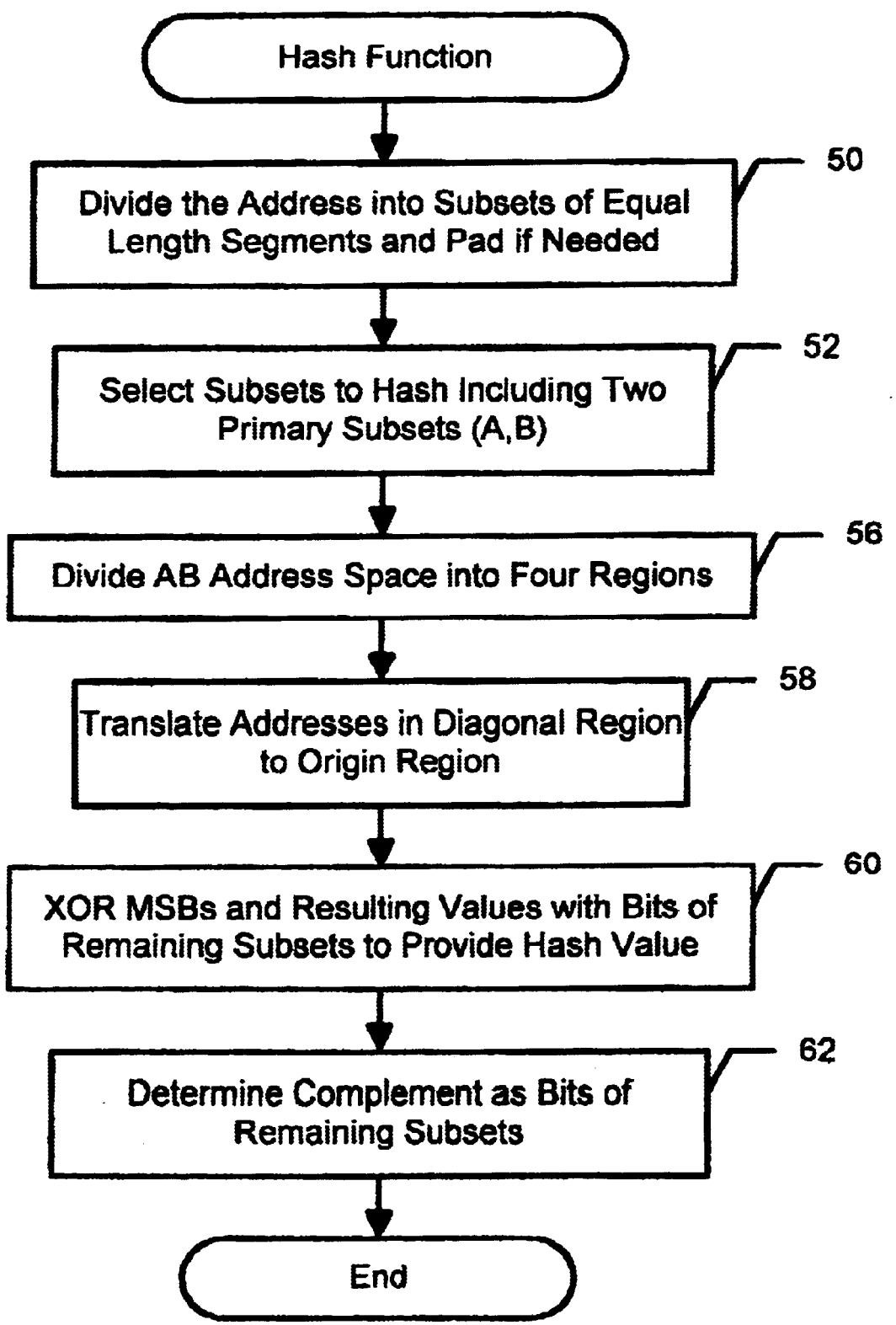
FIG. 2 is a flow chart of a method for providing an invertible, geometric hash for use with an item having a particular number of bits.

FIG. 2 is a flow-chart depicting the invertible, geometric hash function described in the above-mentioned co-pending application. In the context of describing FIG. 2, the item to be hashed is considered to be an address. The address to be hashed is segmented into four segments, or subsets, of equal length, via step 50. In the context of an IP address, the address may be segmented into four eight-bit segments, A.B.C.D. Two of these segments are then selected as the primary segments to hash to define an eight-bit by eight-bit address space, via step 52, and two other segments are selected as the remaining segments to hash. In the present example, the two selected primary segments may be segments A and B and the remaining segments may be C and D. Preferably the two segments which form the address space (the primary segments) are the address segments which have the most variation. As described in the above-mentioned co-pending application, while all four segments are utilized in the present example, where more than thirty-two bits are involved, only a portion of the segments may be utilized. Thus, for a forty-eight bit address, four of the possible six eight-bit segments may be used for the hash. Various choices of four of the six segments lead to different sixteen bit hashes which can be combined using bit-wise XOR to produce a final hash value. Thus, the hash function of the above-mentioned co-pending patent application is preferably used to hash a thirty-two bit item.

The address space defined by A and B is then subdivided into four quadrants, an origin region consisting of the seven bit region of the AB address space adjacent the origin of the (A,B) address space (the origin region), the seven bit address space where the most significant bits of A and B are both a logic "1" value (the diagonal region) and the two seven bit regions where the most significant bits of A and B are logic "1" and logic "0" and logic "0" and logic "1" respectively (the A adjacent region and the B adjacent region), via step 54. Addresses which fall into the diagonal address space are translated from the diagonal region to the origin region, via step 56. Such a translation in the present example may be accomplished by replacing the most significant bits of both A and B with logic "0" or truncating these address bits which translates an address in the diagonal region to the origin region.

The address values in the A adjacent region are "flipped" into the origin region, via step 58, as follows. The address values are first flipped into the origin region by mirroring the addresses around the boundary between the origin region and the A adjacent region to provide first mirrored values, second, by mirroring the first mirrored values around the diagonal line of combinations with A=B to provide respective second mirrored values and finally, by mirroring the second mirrored values about an axis parallel to the A axis and halfway form the A axis to the boundary between the origin region and the A region.

Such a triple flipping operation on the A region can also be expressed as follows. Any point in the A region has coordinates $(0, A_6, \ldots A_0, 1, B_6, \ldots, B_0)$. The first flip yields $(0, A_6, \ldots A_0, 1, -B_6, \ldots, -B_0)$ where "−" denotes bit reversal. The second diagonal flip then yields $(0, -B_6, \ldots -B_0, 0, A_6, \ldots, A_0)$. The third flip then yields $(0, -B_6, -B_0, 0, -A_6, \ldots, -A_0)$. In the present example, the initial point is 8+8=16 bits, however, the same sequence of operations could be executed in any dimension. Furthermore, the goal is to map the A region into the origin region so that the horizontal bands of points become vertical bands of points. Other related sequences of geometric operations could have this same effect.

Similarly, a point in the B region of the form $(1, A_6, \ldots A_0, 0, B_6, \ldots, B_0)$ is flipped three times to become $(0, -B_6, \ldots -B_0, 0, -A_6, \ldots, -A_0)$ in the origin region. Thus, the sixteen bit (A,B) values are hashed to a fourteen bit value. More generally, 2n bits are hashed to 2(n−1) bits.

To return the fourteen bit hash value to a sixteen bit value (which would decrease the hash collisions), the MSB's of A and B may be used to form the least significant bits of the sixteen bit hash value by XORing these values with the MSB bit values from the other segments C and D and then XORing that result with the XOR of lower order bits of C and D. In general, XORing bits is a good hash technique. This comes from the following fact. Suppose a fair coin and a biased coin are simultaneously flipped. Suppose the value of the fair coin is used to either keep or reverse the value of the biased coin. The final value of the biased coin is, therefore, random. Likewise, suppose the value of the biased coin is used to either keep or reverse the value of the fair coin. The final value of the fair coin is random.

Thus, the hash function of the above-mentioned co-pending application improves upon simple XORing of bits in A.B.C.D by using a very first step mapping A,B values into a subset of A,B values which distributes initial scatter plots with bands and voids more uniformly in the subset (the above origin quadrant). After this condensation, XORing values in any standard way preserves the randomness of the scatter plot so obtained.

As described above, the result of the translation and "flipping" of the addresses from the three regions to the origin region is to reduce the sixteen bit value A.B to a fourteen bit value. These fourteen bits are then XORed with the seven least significant bits with respective ones of the remaining segments of the address C and D, via step 60. These fourteen bits may then be combined with the two bits derived from the MSB of A and B to provide a sixteen bit hash value for A.B.C.D. the XORing with the remaining bits further reduces collisions in that address values with the same A and B would have differing hash values based on the C and D XOR and, therefore, not collide. While a specific XORing example has been provided, the hash function of the above-mentioned co-pending application should not be construed as limited to a specific XORing as other XORing operations may also be used which preserve the randomness of the initial operations of flipping of coordinate values which converts scatter plots which are more random.

Thus, a hash value may be provided which converts the vertical and horizontal bands of address in the A and B address space to a more compact cross pattern in the origin region of A and B. the inclusion of C and D further reduces the likelihood of a hash collision by incorporating all thirty-two bits into the hash function. Furthermore, as is seen in FIG. 2, the complement of the hash value may also be provided so that the hash function and its complement becomes invertible, via step 62. The complement of the hash function is a sixteen bit value corresponding to C.D.

As a particular example of the hash function of the above-mentioned co-pending application, the hash function H[n] and its complement H'[i] are listed below, where n and i are bit numbers thirty one through zero.

```
H[31] = ((g AND A[6]) XOR (f AND (NOT B[6]))) XOR C[6]
H[30] = ((g AND A[5]) XOR (f AND (NOT B[5]))) XOR C[5]
H[29] = ((g AND A[4]) XOR (f AND (NOT B[4]))) XOR C[4]
H[28] = ((g AND A[3]) XOR (f AND (NOT B[3]))) XOR C[3]
H[27] = ((g AND A[2]) XOR (f AND (NOT B[2]))) XOR C[2]
H[26] = ((g AND A[1]) XOR (f AND (NOT B[1]))) XOR C[1]
H[25] = ((g AND A[0]) XOR (f AND (NOT B[0]))) XOR C[0]
H[24] = ((g AND B[6]) XOR (f AND (NOT A[6]))) XOR D[6]
H[23] = ((g AND B[5]) XOR (f AND (NOT A[5]))) XOR D[5]
H[22] = ((g AND B[4]) XOR (f AND (NOT A[4]))) XOR D[4]
H[21] = ((g AND B[3]) XOR (f AND (NOT A[3]))) XOR D[3]
H[20] = ((g AND B[2]) XOR (f AND (NOT A[2]))) XOR D[2]
H[19] = ((g AND B[1]) XOR (f AND (NOT A[1]))) XOR D[1]
H[18] = ((g AND B[0]) XOR (f AND (NOT A[0]))) XOR D[0]
H[17] = (D[1]) XOR C[1] XOR (D[7] XOR A[7])
H[16] = (D[0]) XOR C[0] XOR (C[7] XOR B[7])
H'[15] = C[7]
H'[14] = C[6]
H'[13] = C[5]
H'[12] = C[4]
H'[11] = C[3]
H'[10] = C[2]
H'[9] = C[1]
H'[8] = C[0]
H'[7] = D[7]
H'[6] = D[6]
H'[5] = D[5]
H'[4] = D[4]
H'[3] = D[3]
H'[2] = D[2]
H'[1] = D[1]
H'[0] = D[0]
```

Where f=A[7] XOR B[7] and g=NOT f.

Figure 3:
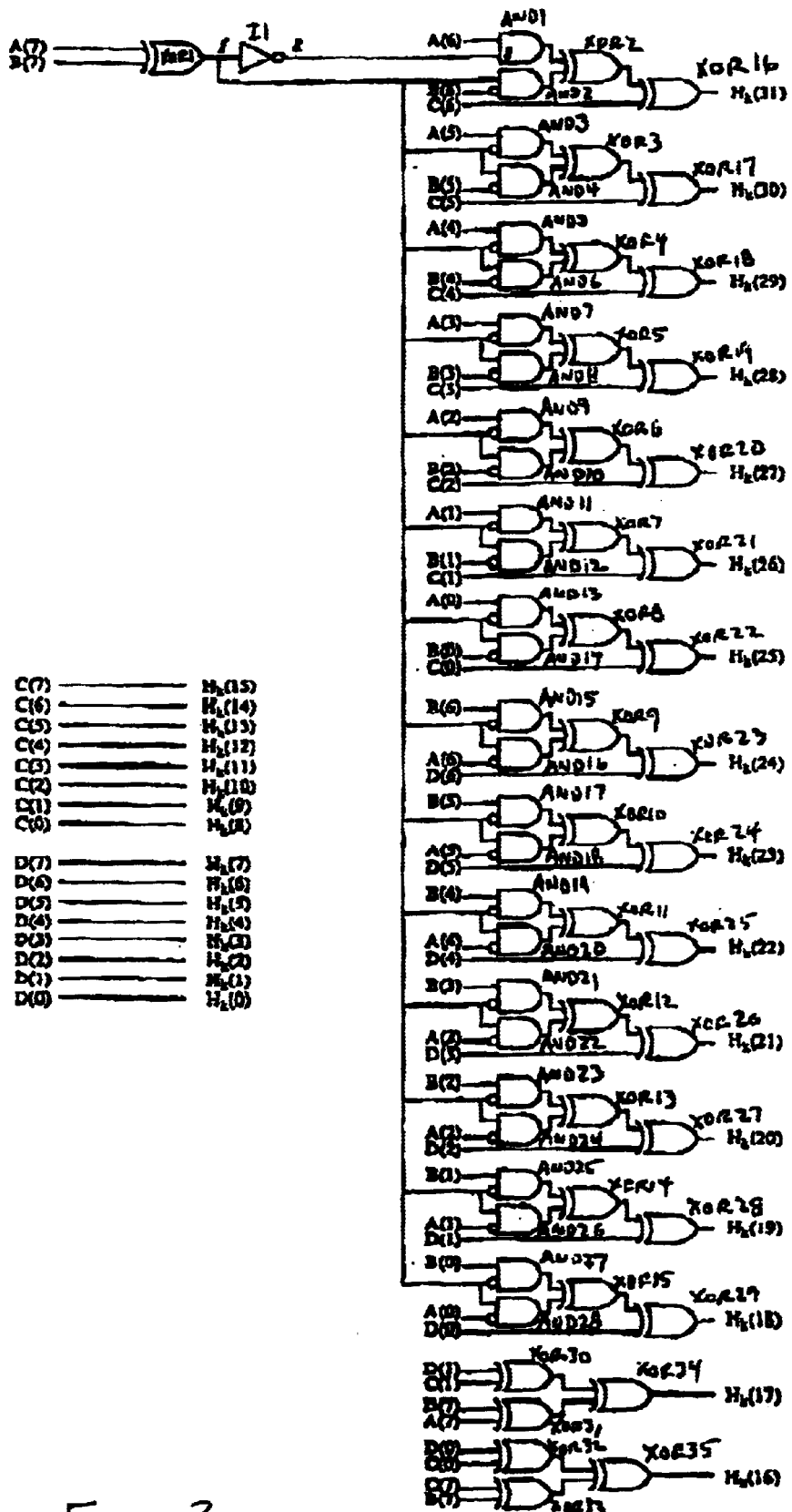
FIG. 3 is a diagram of one embodiment of a system for providing the invertible geometric hash function for use with an item having a particular number of bits.

FIG. 3 depicts one embodiment of a system for providing the exemplary hash function of the above-mentioned co-pending application.

Although the above-mentioned co-pending application functions well for its intended purpose, the hash function of the above mentioned co-pending application is preferably used with items having a particular number of bits. The hash function of the above-mentioned co-pending application is preferably used with an item, such as an address, having thirty-two bits. It may thus be difficult to apply the hash function of the above-mentioned co-pending application to items having a larger number of bits. For example, it may be difficult to extend the hash function of the above-mentioned co-pending application to an item that includes IP five-tuple, which contains 104 bits. Thus, it would be desirable to have an invertible hash function that can be used with items having variable numbers of bits.

The present invention provides a method and system for providing a hash and a complement of the hash for an item in a computer system. The method and system comprise providing a plurality of components from the item. The plurality of components includes a first component and a last component. Each of the plurality of components includes a particular number of bits. The method and system also comprise cascading the plurality of components through at least one XOR to provide a plurality of resultants. The plurality of resultants includes a first resultant and a final resultant. The final resultant includes only the last component. The first resultant includes an XOR of the first component and remaining cascaded components of the plurality of components. The method and system also comprise applying an invertible hash function and an invertible hash function complement to at least the first resultant to provide the hash. The complement of the hash includes the plurality of resultants except the first resultant. In another aspect, the method and system comprise applying the invertible hash function and its complement to at least the first component of the plurality of components, before the plurality of components are cascaded through the at least one XOR. In this aspect, the hash includes the first resultant. The complement of the hash includes the plurality of resultants except the first resultant.

The present invention will be described in terms of particular hash functions However, one of ordinary skill in the art will readily recognize that this method and system will operate effectively for other hash functions. Furthermore, the present invention will be described in terms of a particular algorithm, however, one of ordinary skill in the art will readily recognize that the present invention can be used with other algorithms.

Figure 4A:
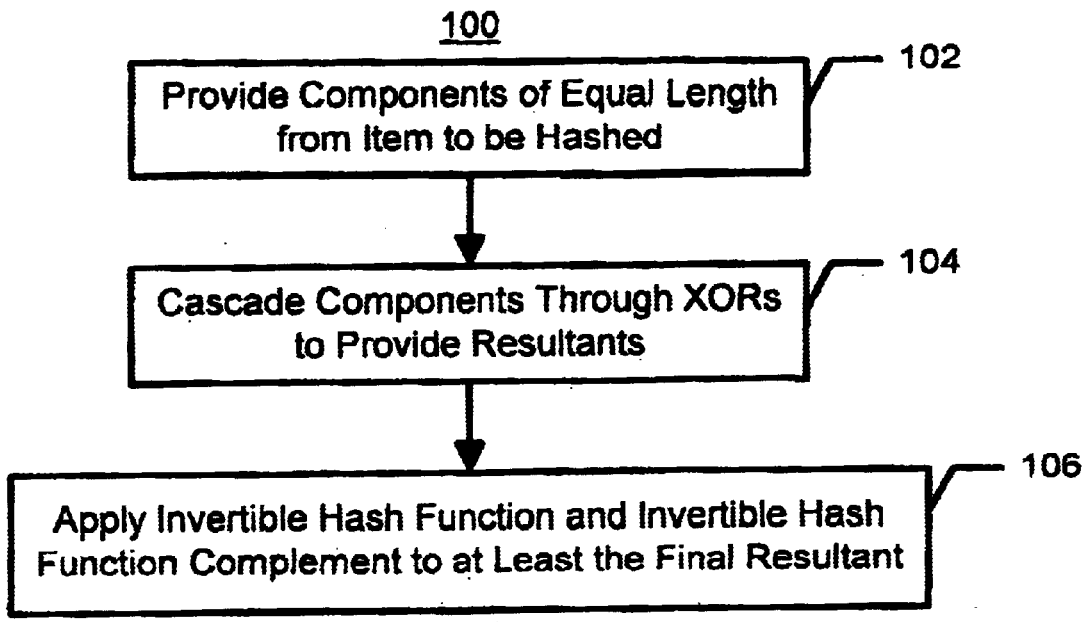
FIG. 4A is a flow chart depicting a first embodiment of a method in accordance with the present invention for providing an invertible hash function that can be used on items having different lengths.

To more particularly illustrate the method and system in accordance with the present invention, refer now to FIG. 4A, depicting a high-level flow chart of one embodiment of a method 100 for providing a hash which can be expanded to items having different numbers of bits and is invertible. The method 100 can be used by the networks 10 and 20 or the Internet 30, for example in the router 35 or the switches 18 and 26. A plurality of components of equal length is provided from the item to be hashed, via step 102. Each of the plurality of components is preferably thirty-two bits in length. If the item includes a multiple of thirty-two bits, then the item can merely be divided into the components. If, however, the item does not include a multiple of thirty-two bits, then the item may be padded to be a multiple of thirty-two bits, then divided into the components.

The components are then cascaded through a plurality of XORs to provide a plurality of resultants, via step 104. The components are cascaded as follows. The plurality of components includes a first component through a last component. The last component is passed unchanged (not passed through an XOR). The last component thus becomes the final resultant. In addition, the last component and is XORed with the second to the last component. In other words, each bit of the last component is XORed with a corresponding bit of the second to the last component. Thus, the first bit of the last component is XORed with the first bit of the second to the last component. The XOR of the last component and the second to the last component become the second to the last resultant. The second to the last resultant (the XOR of the last component and the second to the last component) is then XORed with the third to the last component to become the third to the last resultant. This cascading of the components through the XORs is continued through the first component. The first component is XORed with the second resultant (the XORs of previous components) to provide the first resultant. Thus, through the cascaded XORs, the first resultant depends upon each of the plurality of components.

An invertible hash function and its complement are then applied to at least the first resultant, via step 106. The invertible hash function and its complement are applied in step 106 because, as discussed with respect to the above-mentioned co-pending patent application, the invertible hash function may require the complement to be invertible. Thus, applying the invertible hash function and the invertible hash function complement could be equivalent to applying a single hash function, assuming that the single hash function is invertible in and of itself. The hash function applied in step 106 is an invertible hash function because the hash function and its complement correspond uniquely to an item to which the invertible hash function and the complement are applied. In a preferred embodiment, the invertible hash function and the complement applied in step 106 are the invertible geometric hash and its complement described in the above-mentioned co-pending application. Thus, in a preferred embodiment, the invertible hash and its complement applied in step 106 are H and H', discussed above.

The hash in accordance with the present invention for the item results from the application of the invertible hash function and its complement to the first resultant. The complement of the hash in accordance with the present invention includes the remaining portion of the resultants, some of which the invertible hash function and its complement may have been applied to. Thus, if each component is thirty-two bits in length, the hash is thirty-two bits in length and the complement is n-32 bits, where n is the number of bits in the plurality of components.

Figure 4B:
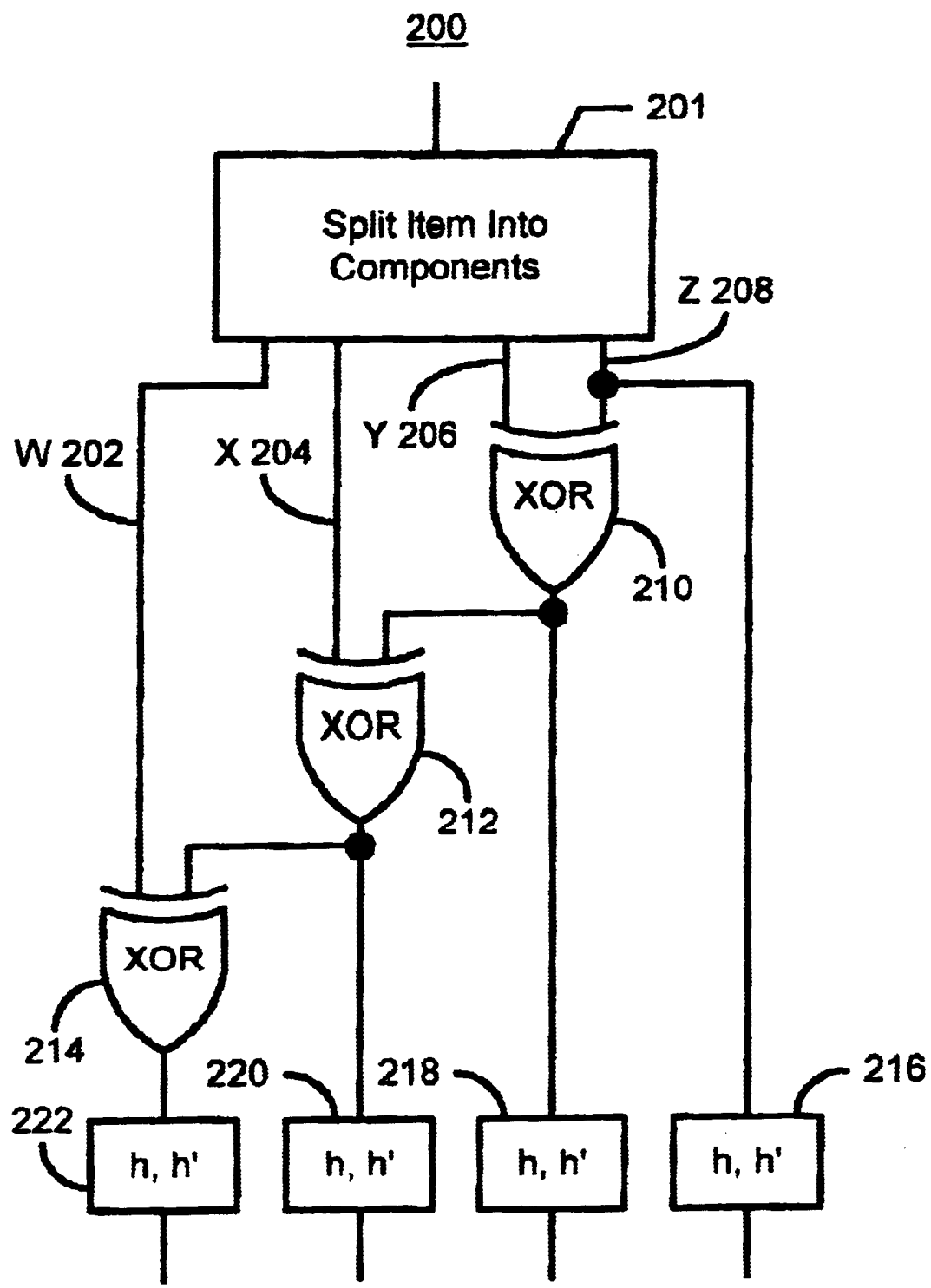
FIG. 4B is a diagram depicting a first embodiment of a system in accordance with the present invention for providing an invertible hash function that can be used on items having different lengths.

FIG. 4B depicts one embodiment of a system 200 for providing the hash and its complement in accordance with the present invention. The system 200 includes means 201 for providing the plurality of components from the item. In the system 200, four components W 202, X 204, Y 206 and Z 208 are depicted. However, nothing prevents the use of another number of components. The plurality XORs are XORs 210, 212 and 214. Thus, the final component, Z 208 is transmitted without XORing as well as being XORed with the component Y 206, using XOR 210. Thus, the final component Z 208 can be considered to be the final, fourth resultant. The output of the XOR 210, Z XOR Y, is the second to the last (third) resultant. The output of the XOR 210 is also provided to the XOR 212. Another input to the XOR 212 is the second component X 204. The output of the XOR 212 is a second resultant which is X XOR (Y XOR Z). In addition, the output of the XOR 212 is provided as an input to the XOR 214. The other input of the XOR 214 is the first component W 202. The output of the XOR 214 is the first resultant W XOR (X XOR (Y XOR Z)). In the system 200, the invertible hash function h and its complement h' are applied to each of the resultants using hash function providing means 216, 218, 220 and 222. However, nothing prevents the use of a different invertible hash function and its complement. Note that in an alternate embodiment, a single means could be used to apply the invertible hash function and its complement to the resultants. In a preferred embodiment, the invertible geometric hash function H and its complement H' of the above-mentioned co-pending application are used. In a preferred embodiment, each of the hash function providing means 216, 218, 220 and 222 are depicted in FIG. 3. However, as depicted in FIG. 4B, any invertible hash function h and its complement h' can be used.

Referring back to FIG. 4B, the hash in accordance with the present invention is the output of the invertible hash function providing means 216. Thus, the hash in accordance with the present invention is h[W XOR (X XOR (Y XOR Z))], h'[W XOR (X XOR (Y XOR Z))]. The complement of the hash in accordance with the present invention is the output of the hash function providing means 218, 220 and 222. Thus, the complement of the hash in accordance with the present invention is h[X XOR (Y XOR Z)], h'[X XOR (Y XOR Z)], h[Y XOR Z], h'[Y XOR Z], h[Z], h'[Z].

Figure 5:
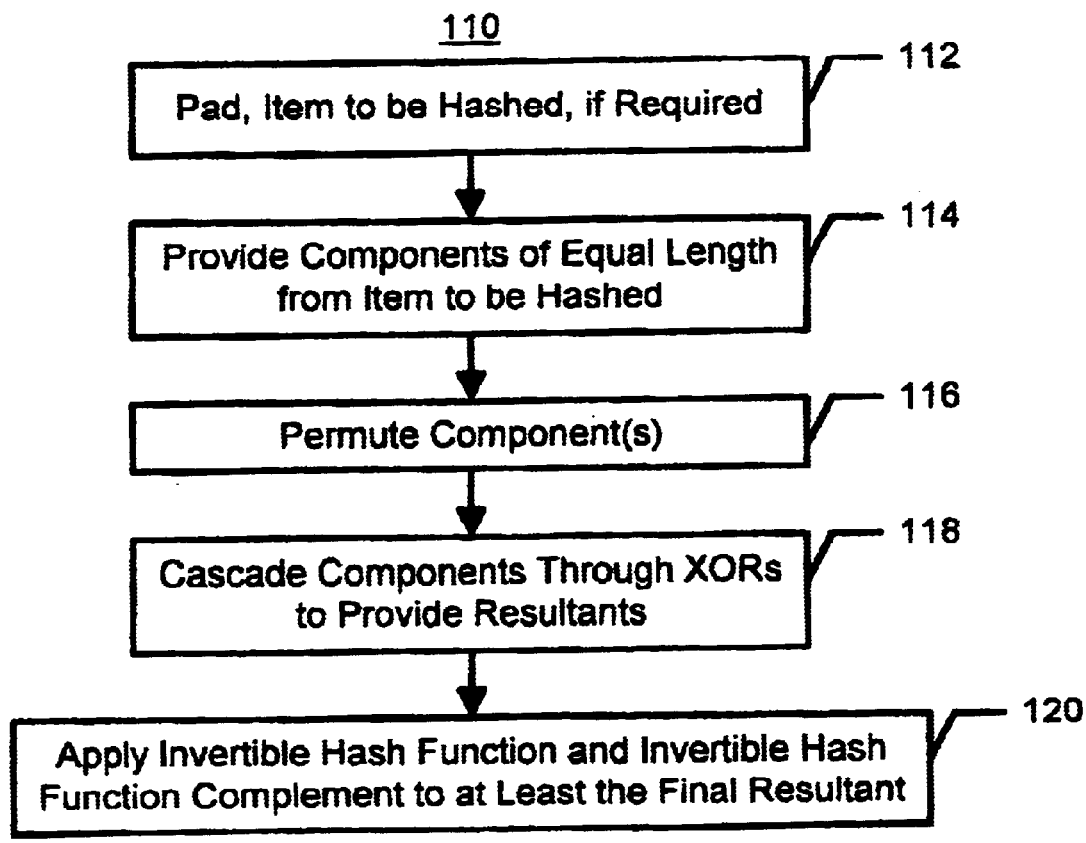
FIG. 5 is a more detailed flow chart depicting the first embodiment of a method in accordance with the present invention for providing an invertible hash function that can be used on items having different lengths.

FIG. 5 depicts a more detailed flow chart of a method 110 for providing a hash in accordance with the present invention which is invertible and can be expanded to items having different numbers of bits. The method 110 can be used by the networks 10 and 20 or the Internet 30, for example in the router 35 or the switches 18 and 26. The item is padded to be a multiple of a particular number of bits, if required, via step 112. The method 110 may be used for items which do not include a multiple of the particular number of bits. For example, the number of bits in each component may be thirty-two bits. The method 110 may thus be used with the IP five-tuple having one hundred and four bits. The closest multiple of thirty-two bits greater than or equal to one hundred and four bits is one hundred and twenty-eight bits. Thus, the method 110 would pad the IP five-tuple with twenty-four bits. Preferably, this is accomplished by adding twenty-four zeroes at the end of the least significant bit of the item. Similarly, the method 110 can be used with MAC addresses, which include forty-eight bits. The MAC address could be padded with sixteen bits so that the padded MAC address includes a total of sixty-four bits, which is a multiple of thirty-two bits.

A plurality of components of equal length is provided from the item to be hashed, including the bits used for padding if any, via step 114. Each of the plurality of components is preferably thirty-two bits in length. One or more of the components may then be permuted, via step 116. For example, suppose that one of the components includes sub-components A.B.C.D, where each of A, B, C and D are eight-bit addresses. This component could be permuted to B.C.D.A or any other of the total of twenty-four possible permutations of A, B, C and D. Permuting the sub-components makes it more difficult to determine the original item from the hash function in accordance with the present invention. Thus, it becomes more difficult for an attacker to discern the correspondence between the hash and the original item, making the system more secure.

After the permuting step 116, the components are cascaded through a plurality of XORs to provide a plurality of resultants, via step 118. The components are cascaded as follows. The plurality of components includes a first component through a last component. The last component is passed unchanged (not passed through an XOR). The last component thus becomes the final resultant. In addition, the last component and is XORed with the second to the last component. In other words, each bit of the last component is XORed with a corresponding bit of the second to the last component. Thus, the first bit of the last component is XORed with the first bit of the second to the last component. The XOR of the last component and the second to the last component become the second to the last resultant. The second to the last resultant (the XOR of the last component and the second to the last component) is then XORed with the third to the last component to become the third to the last resultant. This cascading of the components through the XORs is continued through the first component. The first component is XORed with the second resultant (the XORs of previous components) to provide the first resultant. Thus, through the cascaded XORs, the first resultant depends upon each of the plurality of components.

An invertible hash function and its complement are then applied to at least the first resultant, via step 120. The invertible hash function and its complement are applied in step 120 because, as discussed with respect to the above-mentioned co-pending patent application, the invertible hash function may require the complement to be invertible. Thus, applying the invertible hash function and the invertible hash function complement could be equivalent to applying a single hash function, assuming that the single hash function is invertible in and of itself. The hash function applied in step 120 is an invertible hash function because the hash function and its complement correspond uniquely to an item to which the invertible hash function and the complement are applied. In a preferred embodiment, the invertible hash function and the complement applied in step 120 are the invertible geometric hash and its complement described in the above-mentioned co-pending application. Thus, in a preferred embodiment, the invertible hash and its complement applied in step 106 are H and H', discussed above.

The hash in accordance with the present invention for the item results from the application of the invertible hash function and its complement to the first resultant. The complement of the hash in accordance with the present invention includes the remaining portion of the resultants, some of which the invertible hash function and its complement may have been applied to. Thus, if each component is thirty-two bits in length, the hash is thirty-two bits in length and the complement is n-32 bits, where n is the number of bits in the plurality of components.

The methods 100 and 110, and the system 200 can easily be extended to a larger number of bits. This can be accomplished by adding one or more additional components. The additional components are also cascaded through the XORs to provide a different number of resultants and the invertible hash and its complement are applied to some number of the resultants, including at least the first resultant. Thus, the hash function in accordance with the present invention can be easily extended to a higher number of bits. The first resultant, to which the invertible hash function and its complement are applied, includes each of the components because of the cascaded XORs. As a result, the variability present in each of the components is included in the first resultant. In addition, as discussed above with respect to the above-mentioned co-pending patent application, the XORs preserve the variability present in the components. Thus, the first resultant includes the variability of the item that is being hashed. In addition, the invertible hash function and its complement are applied to the first resultant to provide the hash in accordance with the present invention. Because of the cascaded XORs and the invertible hash function and its complement, the hash in accordance with the present invention of an item is less likely to collide with the hash in accordance with the present invention of another item. This is particularly true if the invertible hash function and its complement are the invertible geometric hash function and the complement described in the above-mentioned co-pending application.

Furthermore, the complement of the hash in accordance with the present invention includes the remaining resultants, to some of which the invertible hash function and its complement may have been applied. The hash and the complement in accordance with the present invention are also invertible. Thus, there is a one-to-one correspondence between the hash and the complement and the item which is being hashed. Thus, if there is a collision between the hash of one item and the hash of another item, it is guaranteed that there will be no collision in the complement for the item and the complement of the other item. Consequently, there will be no need to search for the original item if a collision occurs in the hash. Instead, the complement of the hash can be used.

Figure 6A:
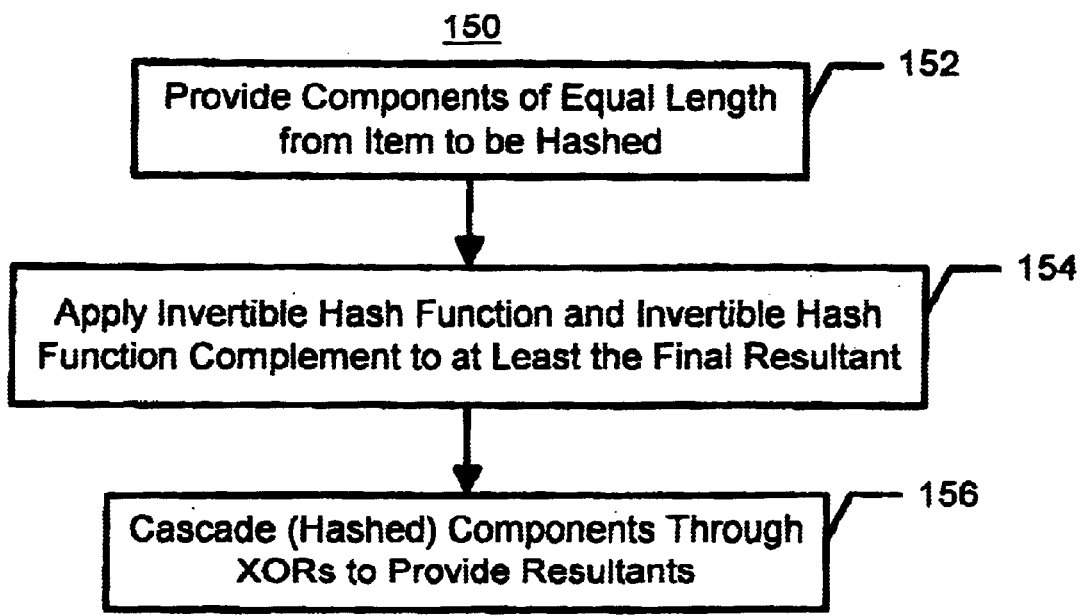
FIG. 6A is a flow chart depicting a second embodiment of a method in accordance with the present invention for providing an invertible hash function that can be used on items having different lengths.

FIG. 6A depicts a second embodiment of a method 150 for providing a hash in accordance with the present invention that is invertible and can be extended to a larger number of bits. The method 150 can be used by the networks 10 and 20 or the Internet 30, for example in the router 35 or the switches 18 and 26. A plurality of components of equal length is provided from the item to be hashed, via step 152. Each of the plurality of components is preferably thirty-two bits in length. If the item includes a multiple of thirty-two bits, then the item can merely be divided into the components. If, however, the item does not include a multiple of thirty-two bits, then the item may be padded to be a multiple of thirty-two bits, then divided into the components.

An invertible hash function and its complement are then applied to at least the first component, via step 154. The invertible hash function and its complement are applied in step 154 because, as discussed with respect to the above-mentioned co-pending patent application, the invertible hash function may require the complement to be invertible. Thus, applying the invertible hash function and the invertible hash function complement could be equivalent to applying a single hash function, assuming that the single hash function is invertible in and of itself. The hash function applied in step 154 is an invertible hash function because the hash function and its complement correspond uniquely to an item to which the invertible hash function and the complement are applied. In a preferred embodiment, the invertible hash function and the complement applied in step 154 are the invertible geometric hash and its complement described in the above-mentioned co-pending application. Thus, in a preferred embodiment, the invertible hash and its complement applied in step 154 are H and H', discussed above.

After the application of the invertible hash function and its complement, the components are then cascaded through a plurality of XORs to provide a plurality of resultants, via step 156. The components are cascaded as follows. The plurality of components includes a first component through a last component. After application of the invertible hash function and its complement (if applied to the last component), the last component is passed unchanged (not passed through an XOR). The last component thus becomes the final resultant. In addition, the last component and is XORed with the second to the last component, to which the invertible hash function and its complement may have been applied. In other words, each bit of the last component is XORed with a corresponding bit of the second to the last component. Thus, the first bit of the last component is XORed with the first bit of the second to the last component. The XOR of the last component and the second to the last component become the second to the last resultant. The second to the last resultant (the XOR of the last component and the second to the last component) is then XORed with the third to the last component, to which the invertible hash function and its complement may have been applied, thereby providing the third to the last resultant. This cascading of the components through the XORs is continued through the first component. The first component, to which the invertible hash function and its complement have been applied, is XORed with the second resultant (the XORs of previous components) to provide the first resultant. Thus, through the cascaded XORs, the first resultant depends upon each of the plurality of components.

The hash in accordance with the present invention for the item is the first resultant. The complement of the hash in accordance with the present invention includes the remaining portion of the resultants. Thus, if each component is thirty-two bits in length, the hash is thirty-two bits in length and the complement is n-32 bits, where n is the number of bits in the plurality of components.

Figure 6B:
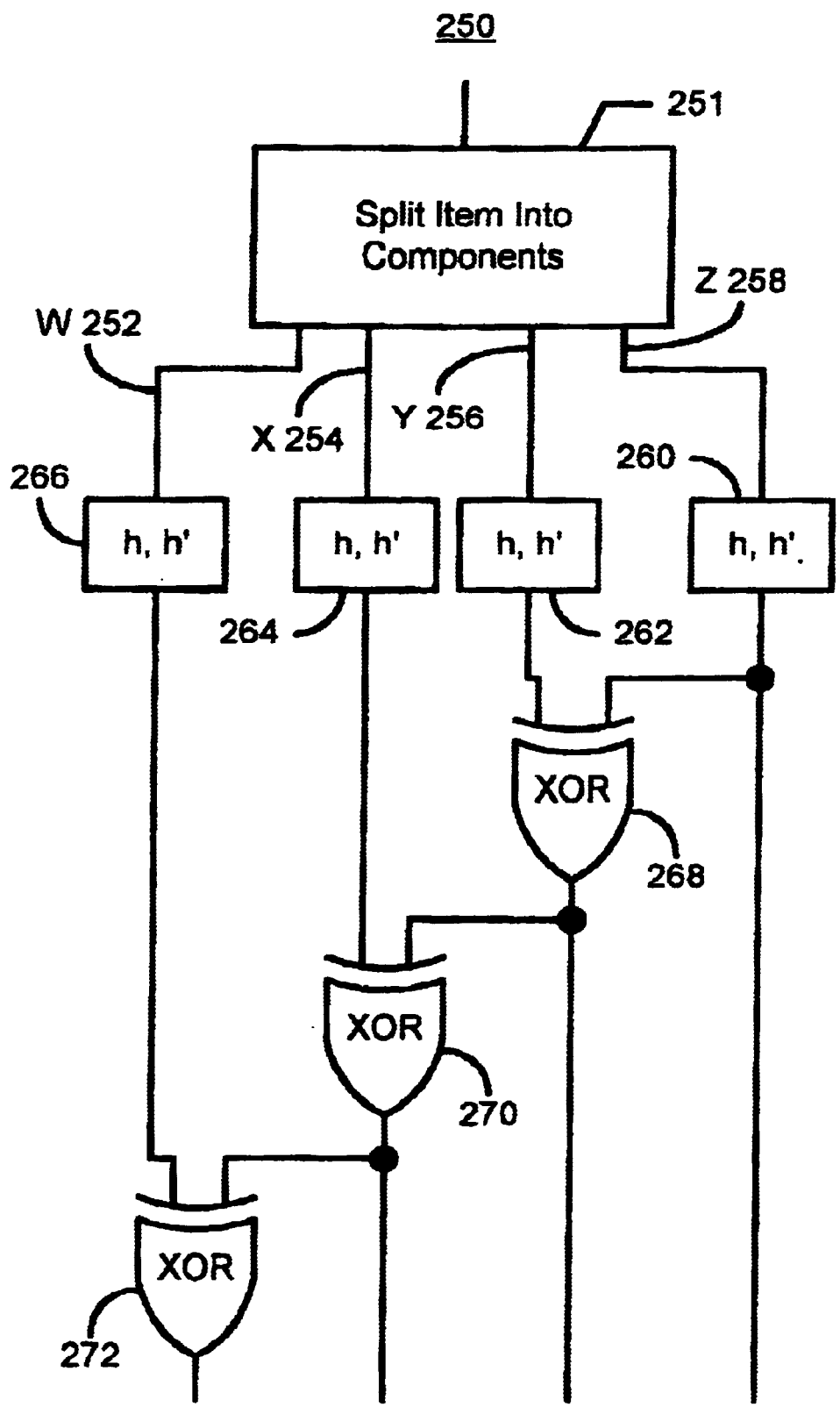
FIG. 6B is a diagram depicting a second embodiment of a system in accordance with the present invention for providing an invertible hash function that can be used on items having different lengths.

FIG. 6B depicts one embodiment of a system 250 for providing the hash and its complement in accordance with the present invention. The system 250 includes means 251 for providing the plurality of components from the item. In the system 250, four components W 252, X 254, Y 256 and Z 258 are depicted. However, nothing prevents the use of another number of components.

In the system 250, the invertible hash function h and its complement h' are applied to each of the components using hash function providing means 260, 262, 264 and 266. However, nothing prevents the use of a different invertible hash function and its complement. In addition, nothing prevents applying the invertible hash function to fewer components, including only the first component X 252. In an alternate embodiment, a single means could be used to apply the invertible hash function and its complement to the components. In a preferred embodiment, the invertible geometric hash function H and its complement H' of the above-mentioned co-pending application are used. In a preferred embodiment, each of the hash function providing means 260, 262, 264 and 266 are depicted in FIG. 3. However, as depicted in FIG. 6B, any invertible hash function h and its complement h' can be used.

Referring back to FIG. 6B, the plurality of components are then cascaded through the plurality XORs 268, 270 and 272. Thus, the final component, Z 258 is transmitted without XORing as well as being XORed with the component Y 256, using XOR 268. Thus, the final component Z 258, after being passed through the invertible hash function providing means 260, can be considered to be the final resultant. Thus, the final resultant is h[Z],h'[Z]. The output of the XOR 268, (h[Z],h'[Z]) XOR (h[Y],h'[Y]), is the second to the last (the third) resultant. The output of the XOR 268 is also provided to the XOR 270. Another input to the XOR 270 is the second component X 254 after passage through the invertible hash function providing means 262, or h[X],h'[X]. The output of the XOR 270 is a third to the last (the second) resultant which is (h[X],h'[X]) XOR ((h[Y],h'[Y]) XOR (h[Z],h'[Z])). In addition, the output of the XOR 270 is provided as an input to the XOR 272. The other input of the XOR 272 is h[W],h'[W], the first component W 252 having been passed through the invertible hash function providing means 266. The output of the XOR 214 is the first resultant (h[W],h'[W]) XOR ((h[X],h'[X]) XOR ((h[Y],h'[Y]) XOR (h[Z],h'[Z]))).

The hash in accordance with the present invention is the first resultant. Thus, the hash in accordance with the present invention is (h[W],h'[W]) XOR ((h[X],h'[X]) XOR ((h[Y], h'[Y]) XOR (h[Z],h'[Z]))). The complement of the hash in accordance with the present invention is the remaining resultants. Thus, the complement of the hash in accordance with the present invention is (h[X],h'[X]) XOR ((h[Y],h'[Y]) XOR (h[Z],h'[Z])), (h[Z],h'[Z]) XOR (h[Y],h'[Y]), h[Z], h'[Z].

Figure 7:
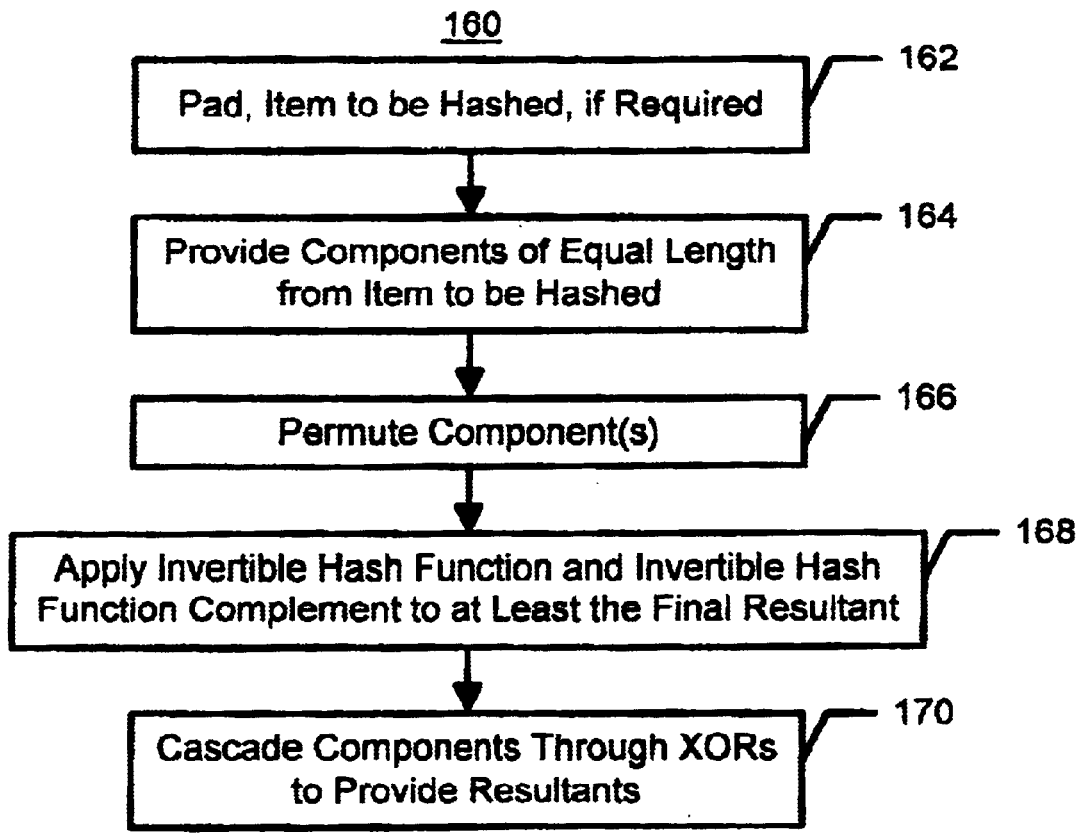
FIG. 7 is a more detailed flow chart depicting the second embodiment of a method in accordance with the present invention for providing an invertible hash function that can be used on items having different lengths.

FIG. 7 depicts a more detailed flow chart of a method 160 for providing a hash in accordance with the present invention which is invertible and can be expanded to items having different numbers of bits. The method 160 can be used by the networks 10 and 20 or the Internet 30, for example in the router 35 or the switches 18 and 26. The item is padded to be a multiple of a particular number of bits, if required, via step 162. The method 160 may be used for items which do not include a multiple of the particular number of bits. For example, the number of bits in each component may be thirty-two bits. The method 160 may thus be used with the IP five-tuple having one hundred and four bits. The closest multiple of thirty-two bits greater than or equal to one hundred and four bits is one hundred and twenty-eight bits. Thus, the method 110 would pad the IP five-tuple with twenty-four bits. Preferably, this is accomplished by adding twenty-four zeroes at the end of the least significant bit of the item. Similarly, the method 110 can be used with MAC addresses, which include forty-eight bits. The MAC address could be padded with sixteen bits so that the padded MAC address includes a total of sixty-four bits, which is a multiple of thirty-two bits.

A plurality of components of equal length is provided from the item to be hashed, including the bits used for padding if any, via step 164. Each of the plurality of components is preferably thirty-two bits in length. One or more of the components may then be permuted, via step 166. For example, suppose that one of the components includes sub-components A.B.C.D, where each of A, B, C and D are eight-bit addresses. This component could be permuted to B.C.D.A or any other of the total of twenty-four possible permutations of A, B, C and D. Permuting the sub-components makes it more difficult to determine the original item from the hash function in accordance with the present invention. Thus, it becomes more difficult for an attacker to discern the correspondence between the hash and the original item, making the system more secure.

After the permuting step 166, an invertible hash function and its complement are then applied to at least the first component, via step 168. The invertible hash function and its complement are applied in step 168 because, as discussed with respect to the above-mentioned co-pending patent application, the invertible hash function may require the complement to be invertible. Thus, applying the invertible hash function and the invertible hash function complement could be equivalent to applying a single hash function, assuming that the single hash function is invertible in and of itself. The hash function applied in step 168 is an invertible hash function because the hash function and its complement correspond uniquely to an item to which the invertible hash function and the complement are applied. In a preferred embodiment, the invertible hash function and the complement applied in step 168 are the invertible geometric hash and its complement described in the above-mentioned co-pending application. Thus, in a preferred embodiment, the invertible hash and its complement applied in step 168 are H and H' of the above-mentioned co-pending application, discussed above. However, as depicted in FIG. 7, any invertible hash function h and its complement h' can be used.

After the application of the invertible hash function and its complement, the components are then cascaded through a plurality of XORs to provide a plurality of resultants, via step 170. The components are cascaded as follows. The plurality of components includes a first component through a last component. After application of the invertible hash function and its complement (if applied to the last component), the last component is passed unchanged (not passed through an XOR). The last component thus becomes the final resultant. In addition, the last component and is XORed with the second to the last component, to which the invertible hash function and its complement may have been applied. In other words, each bit of the last component is XORed with a corresponding bit of the second to the last component. Thus, the first bit of the last component is XORed with the first bit of the second to the last component. The XOR of the last component and the second to the last component become the second to the last resultant. The second to the last resultant (the XOR of the last component and the second to the last component) is then XORed with the third to the last component, to which the invertible hash function and its complement may have been applied, thereby providing the third to the last resultant. This cascading of the components through the XORs is continued through the first component. The first component, to which the invertible hash function and its complement have been applied, is. XORed with the second resultant (the XORs of previous components) to provide the first resultant. Thus, through the cascaded XORs, the first resultant depends upon each of the plurality of components.

The hash in accordance with the present invention for the item is the first resultant. The complement of the hash in accordance with the present invention includes the remaining portion of the resultants. Thus, if each component is thirty-two bits in length, the hash is thirty-two bits in length and the complement is n-32 bits, where n is the number of bits in the plurality of components.

The methods 150 and 160, and the system 250 can easily be extended to a larger number of bits. This can be accomplished by adding one or more additional components. The additional components are also cascaded through the XORs to provide a different number of resultants. The invertible hash and its complement are applied to some number of the components, including at least the first component. Thus, the hash function in accordance with the present invention can be easily extended to a higher number of bits. The first resultant includes each of the components because of the cascaded XORs. As a result, the variability present in each of the components is included in the first resultant. In addition, as discussed above with respect to the above-mentioned co-pending patent application, the XORs preserve the variability present in the components. Thus, the first resultant includes the variability of the item that is being hashed. In addition, the invertible hash function and its complement are applied to at least the first component. Because of the cascaded XORs and the invertible hash function and its complement, the hash in accordance with the present invention of an item is less likely to collide with the hash in accordance with the present invention of another item. This is particularly true if the invertible hash function and its complement are the invertible geometric hash function and the complement described in the above-mentioned co-pending application.

Furthermore, the complement of the hash in accordance with the present invention includes the remaining resultants. The hash and the complement in accordance with the present invention are invertible. Thus, there is a one-to-one correspondence between the hash and the complement and the item which is being hashed. Thus, if there is a collision between the hash of one item and the hash of another item, it is guaranteed that there will be no collision in the complement for the item and the complement of the other item. Consequently, there will be no need to search for distinguishing bits in the original item if a collision occurs in the hash. Instead, the complement of the hash can be used.

Figure 8:
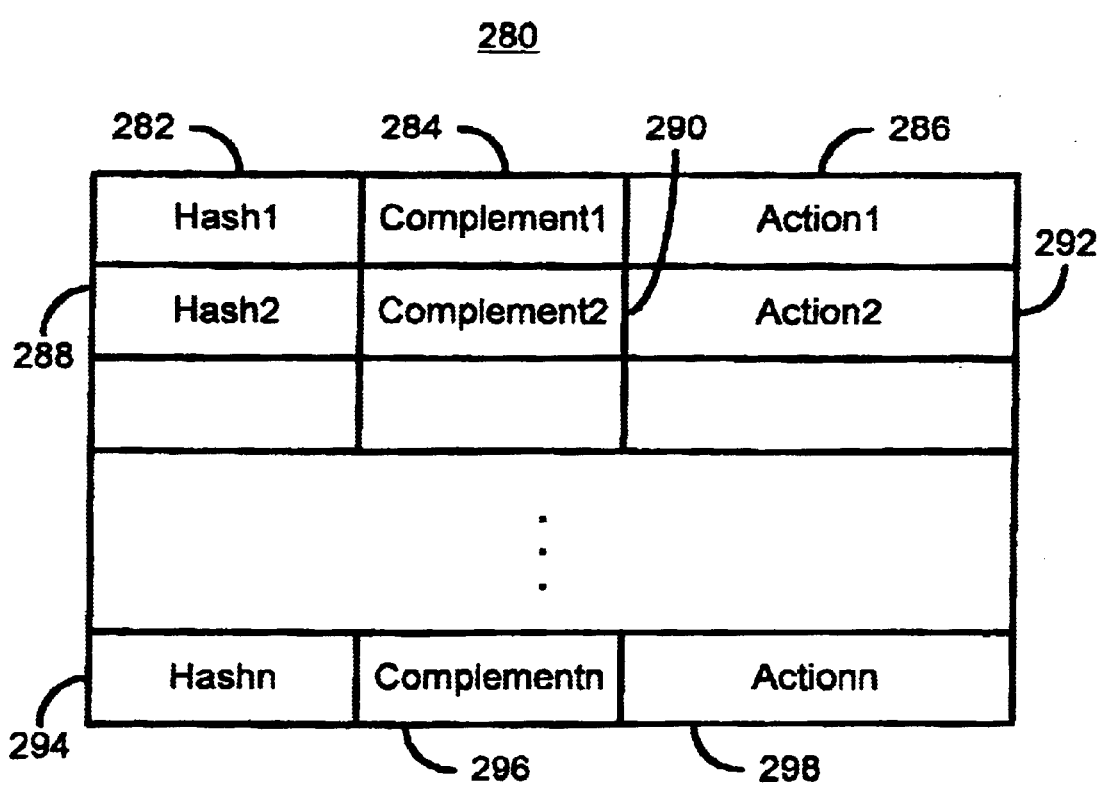
FIG. 8 is a diagram of a hash table incorporating a hash and its complement that can be extended to larger items in accordance with the present invention.

FIG. 8 depicts one embodiment of a table 280 that is used in conjunction with the hash and its complement in accordance with the present invention that are, for example, provided using the method 100, 110, 150 or 160 or the system 200 or 250. The table includes hashes 282, 288 and 294, complements 284, 290 and 296 and actions 286, 292 and 298. When an item is hashed to the table 280, the hash 282, 288 or 294 is first used to determine which action should be taken for the item. Suppose there is a collision between the hash for an item and the hash for another item. If the hashes for two items collide, such as for the hashes 282 and 288, then the complements 284 and 290 are used. Using the complements 284 and 290, the collision can be resolved. The appropriate action of the actions 286 and 292 can then be selected without having to search for the original item. Thus, the hash and complement in accordance with the present invention are invertible.

Figure 9:
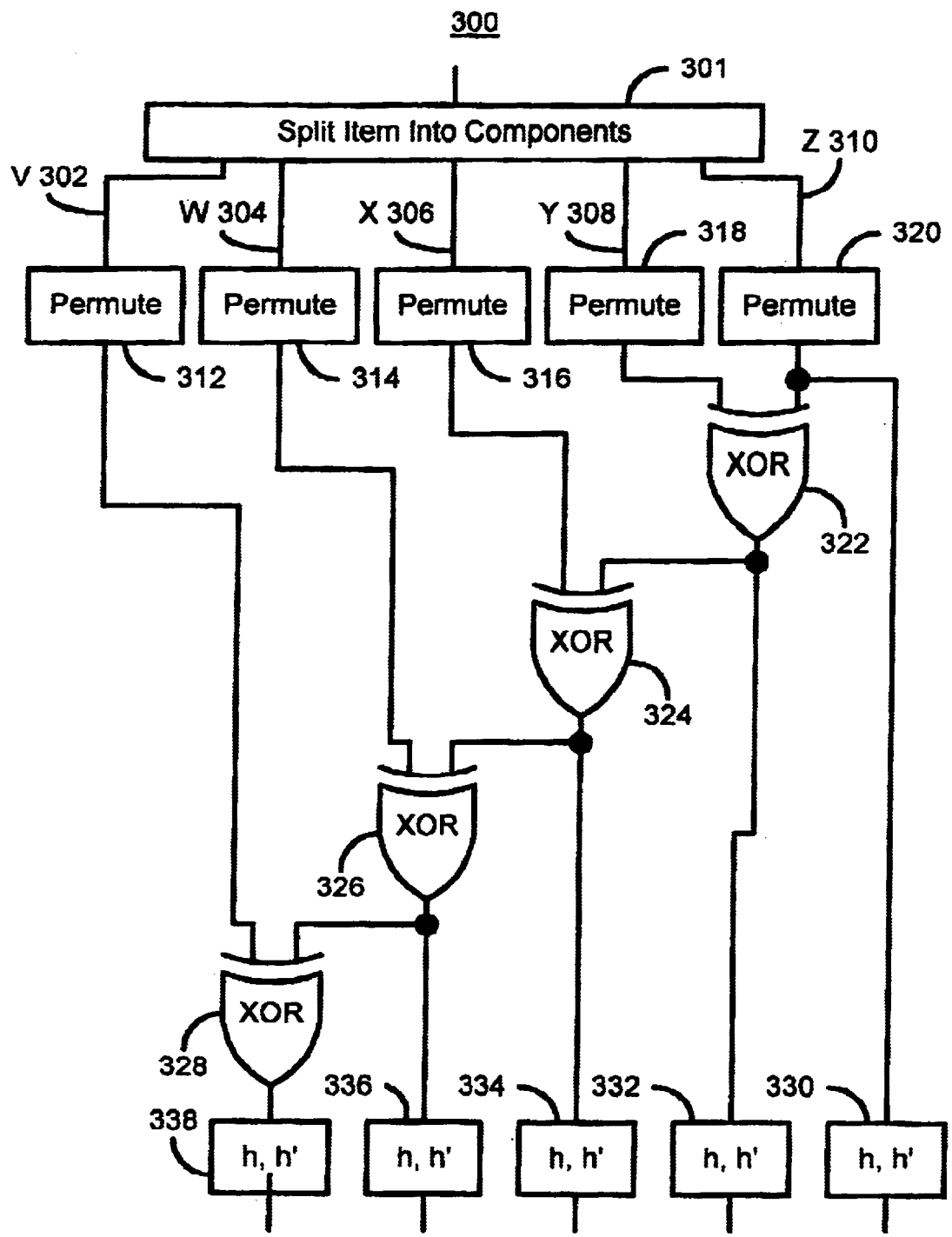
FIG. 9 is a diagram depicting the first embodiment of a system in accordance with the present invention for providing an invertible hash function that has been extended to be used on items having higher lengths.

To more clearly indicate how the methods 100, 110, 150 and 106 and the system 200 and 250 can be extended to items having a different number of bits, refer to FIG. 9. FIG. 9 depicts a system 300 that is similar to the system 200 depicted in FIG. 4B. However, the system 300 is utilized with five components instead of four components. Thus, if each component includes thirty-two bits, the system 300 is four items having up to one hundred and sixty bits, while the system 200 would be used with items having up to one hundred and twenty-eight bits.

The system 300 includes means 301 for providing the plurality of components from the item. In the system 300, five components U 302, W 304, X 306, Y 308 and Z 310 are depicted. However, nothing prevents the use of another number of components. The components U 302, W 304, X 306, Y 308 and Z 310 are permuted by permutation blocks 312, 314, 316, 318 and 320, respectively. The permutation blocks 312, 314, 316, 318 and 320 need not provide the same permutation for each of the components U 302, W 304, X 306, Y 308 and Z 310, respectively. Furthermore, in an alternate embodiment, only some or none of the permutations blocks 302, 304, 306, 308 and 310 may be used. The permuted components U 302, W 304, X 306, Y 308 and Z 310 are then provided to a plurality XORs 322, 324, 326 and 328. Thus, the final permuted component, Z 310 is transmitted without XORing as well as being XORed with the component Y 308, using XOR 322. Thus, the permuted final component Z 310 can be considered to be the last, fifth resultant. The output of the XOR 322, (permuted Z) XOR (permuted Y), is the second to the last (the fourth) resultant. The output of the XOR 322 is also provided to the XOR 324. Another input to the XOR 324 is the permuted third component X 306. The output of the XOR 324 is a third resultant which is (permuted X) XOR ((permuted Y) XOR (permuted Z)). In addition, the output of the XOR 324 is provided as an input to the XOR 326. The other input of the XOR 326 is the permuted second component W 304. The output of the XOR 326 is the second resultant (permuted W) XOR ((permuted X) XOR ((permuted Y) XOR (permuted Z))). The second resultant and the permuted first component V 302 are provided to the input of the XOR 328. The output of the XOR 328 is the first resultant, (permuted V) XOR {(permuted W) XOR ((permuted X) XOR ((permuted Y) XOR (permuted Z)))}. In the system 300, the invertible hash function h and its complement h' are applied to each of the resultants using hash function providing means 330, 332, 334, 336 and 338. However, nothing prevents the to use of a different invertible hash function and its complement. Note that in an alternate embodiment, a single means could be used to apply the invertible hash function and its complement to the resultants. In a preferred embodiment, the invertible geometric hash function H and its complement H' are used. In a preferred embodiment, each of the hash function providing means 330, 332, 334, 336 and 338 are depicted in FIG. 3.

Referring back to FIG. 8, the hash in accordance with the present invention is the output of the invertible hash function providing means 338. Thus, the hash in accordance with the present invention is h[(permuted V) XOR {(permuted W) XOR ((permuted X) XOR ((permuted Y) XOR (permuted Z)))}], h'[(permuted V) XOR {(permuted W) XOR ((permuted X) XOR ((permuted Y) XOR (permuted Z)))}]. The complement of the hash in accordance with the present invention is the output of the hash function providing means 218, 220 and 222. Thus, the complement of the hash in accordance with the present invention is h[(permuted W) XOR ((permuted X) XOR ((permuted Y) XOR (permuted Z)))], h'[(permuted W) XOR ((permuted X) XOR (permuted Z)))], h[(permuted X) XOR ((permuted Y) XOR (permuted Z))], h'[(permuted X) XOR ((permuted Y) XOR (permuted Z))], h[(permuted Z) XOR (permuted Y)], h'[(permuted Z) XOR (permuted Y)], h[permuted Z], h'[permuted Z]. Thus, the hash and its complement in accordance with the present invention are easily extended to higher numbers of bits using additional XORs and, if desired, applying the invertible hash function and its complement to the additional components or additional resultants.

Thus, the method and system in accordance with the present invention can provide an hash and its complement that are invertible. Thus, there is a one-to-one correspondence between the hash and its complement and the original item hashed. In other words, if there are collisions in the hash, there are guaranteed not to be collisions in the complement. Thus, collisions in the hash can be resolved using the complement, without searching for the original item. In addition, the hash and its complement can easily be extended to items having greater numbers of bits. Even if the items do not have a number of bits that can be evenly divided into the components, the items can be padded to the desired number of bits. Thus, the hash and its complement in accordance with the present invention are extendable to larger numbers of bits and invertible.

A method and system has been disclosed for providing a hash function which is invertible and can be used with keys having a variety of sizes. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a hash and a complement of the hash for an item in a computer system, the method comprising the steps of:

(a) providing a plurality of components from the item, the plurality of components including a first component and a last component, each of the plurality of components includes a particular number of bits;

(b) cascading the plurality of components through at least one XOR to provide a plurality of resultants, the plurality of resultants including a first resultant and a final resultant, the final resultant including only the last component and the first resultant including an XOR of the first component and remaining cascaded components of the plurality of components; and (c) applying an invertible hash function and an invertible hash function complement to at least the first resultant to provide the hash, the complement of the hash including the plurality of resultants except the first resultant.

2. The method of claim 1 wherein the invertible hash function is an invertible geometric hash function and the invertible hash function complement an invertible geometric hash function complement.

3. The method of claim 1 wherein each of the plurality of components includes thirty-two bits.

4. The method of claim 1 wherein the final component includes a plurality of bits used to pad the final component to the particular number of bits.

5. The method of claim 1 wherein the invertible hash function and the invertible hash function complement providing step (c) further includes the step of:

(c1) applying the invertible hash function and the invertible hash function complement to each of the plurality of resultants, the hash including the invertible hash function and the invertible hash function complement of the first resultant, the complement of the hash including the invertible hash function and the invertible hash function complement of each of the plurality of resultants except the first resultant.

6. The method of claim 1 further comprising the step of:
(d) providing a permutation of at least one component of the plurality of components.

7. A method for providing a hash and a complement of the hash for an item in a computer system, the method comprising the steps of:
(a) providing a plurality of components from the item, the plurality of components including a first component and a last component, each of the plurality of components includes a particular number of bits;
(b) applying an invertible hash function and an invertible hash function complement to at least the first component of the plurality of components; and
(c) cascading the plurality of components after application of the hash function and the hash function complement through at least one XOR to provide a plurality of resultants, the plurality of resultants including a first resultant and a final resultant, the final resultant including only the last component and the first resultant including an XOR of the first component and remaining cascaded components of the plurality of components, the hash including the first resultant and the complement of the hash including the plurality of resultants except the first resultant.

8. The method of claim 7 wherein the invertible hash function is an invertible geometric hash function and the invertible hash function complement is an invertible geometric hash function complement.

9. The method of claim 7 wherein each of the plurality of components includes thirty-two bits.

10. The method of claim 7 wherein the final component includes a plurality of bits used to pad the final component to the particular number of bits.

11. The method of claim 7 wherein the invertible hash function and the invertible hash function complement providing step (b) further includes the step of:
(b1) applying the invertible hash function and the invertible hash function complement to each of the plurality of components.

12. The method of claim 7 further comprising the step of:
(d) providing a permutation of at least one component of the plurality of components.

13. A computer-readable medium containing a program for providing a hash and a complement of the hash for an item in a computer system, the program including instructions for:
(a) providing a plurality of components from the item, the plurality of components including a first component and a last component, each of the plurality of components includes a particular number of bits;
(b) cascading the plurality of components through at least one XOR to provide a plurality of resultants, the plurality of resultants including a first resultant and a final resultant, the final resultant including only the last component and the first resultant including an XOR of the first component and remaining cascaded components of the plurality of components; and
(c) applying an invertible hash function and an invertible hash function complement to at least the first resultant to provide the hash, the complement of the hash including the plurality of resultants except the first resultant.

14. The computer-readable medium of claim 13 wherein the invertible hash function is an invertible geometric hash function and the invertible hash function complement is an invertible geometric hash function complement.

15. The computer-readable medium of claim 13 wherein each of the plurality of components includes thirty-two bits.

16. The computer-readable medium of claim 13 wherein the final component includes a plurality of bits used to pad the final component to the particular number of bits.

17. The computer-readable medium of claim 13 wherein the invertible hash function and the invertible hash function complement providing instructions (c) further includes instructions for:
(c1) applying the invertible hash and the invertible hash function complement to each of the plurality of resultants, the hash including the invertible hash function and the invertible hash function complement of the first resultant, the complement of the hash including the invertible hash function and the invertible hash function complement of each of the plurality of resultants except the first resultant.

18. The computer-readable medium of claim 13 further comprising instructions for:
(d) providing a permutation of at least one component of the plurality of components.

19. A computer-readable medium for providing a hash and a complement of the hash for an item in a computer system, the program including instructions for:
(a) providing a plurality of components from the item, the plurality of components including a first component and a last component, each of the plurality of components includes a particular number of bits;
(b) applying an invertible hash function and an invertible hash function complement to at least the first component of the plurality of components;
(c) cascading the plurality of components after application of the hash function and the hash function complement through at least one XOR to provide a plurality of resultants, the plurality of resultants including a first resultant and a final resultant, the final resultant including only the last component and the first resultant including an XOR of the first component and remaining cascaded components of the plurality of components, the hash including the first resultant and the complement of the hash including the plurality of resultants except the first resultant.

20. The computer-readable medium of claim 19 wherein the invertible hash function is an invertible geometric hash function and the invertible hash function complement is an invertible geometric hash function complement.

21. The computer-readable medium of claim 19 wherein each of the plurality of components includes thirty-two bits.

22. The computer-readable medium of claim 19 wherein the final component includes a plurality of bits used to pad the final component to the particular number of bits.

23. The computer-readable medium of claim 19 wherein the invertible hash function and the invertible hash function complement providing instructions (b) further includes instructions for:
(b1) applying the invertible hash function and the invertible hash function complement to each of the plurality of components.

24. The computer-readable medium of claim 19 further comprising instructions for:

(e) providing a permutation of at least one component of the plurality of components.

25. A system for providing a hash and a complement of the hash for an item in a computer system, the system comprising:

means for providing a plurality of components from the item, the plurality of components including a first component and a last component, each of the plurality of components includes a particular number of bits;

means for cascading the plurality of components through at least one XOR to provide a plurality of resultants, the plurality of resultants including a first resultant and a final resultant, the final resultant including only the last component and the first resultant including an XOR of the first component and remaining cascaded components of the plurality of components; and means for applying an invertible hash function and an invertible hash function complement to at least the first resultant to provide the hash, the complement of the hash including the plurality of resultants except the first resultant.

26. The system of claim 25 wherein the invertible hash function is an invertible geometric hash function and the invertible hash function complement is an invertible geometric hash function complement.

27. The system of claim 25 wherein each of the plurality of components includes thirty-two bits.

28. The system of claim 25 wherein the final component includes a plurality of bits used to pad the final component to the particular number of bits.

29. The system of claim 25 wherein the invertible hash function providing means further includes:

means for applying the invertible hash function and the invertible hash function complement to each of the plurality of resultants, the hash including the invertible hash function and the invertible hash function complement of the first resultant, the complement hash including the invertible hash and the invertible hash function complement of each of the plurality of resultants except the first resultant.

30. The system of claim 25 further comprising:

means for providing a permutation of at least one component of the plurality of components.

31. A system for providing a hash and a complement of the hash for an item in a computer system, the system comprising:

means for providing a plurality of components from the item, the plurality of components including a first component and a last component, each of the plurality of components includes a particular number of bits;

means for applying an invertible hash function and an invertible hash function complement to at least the first component of the plurality of components; and means for cascading the plurality of components through at least one XOR after application of the hash function and the hash function complement to provide a plurality of resultants, the plurality of resultants including a first resultant and a final resultant, the final resultant including only the last component and the first resultant including an XOR of the first component and remaining cascaded components of the plurality of components, the hash including the first resultant and the complement of the hash including the plurality of resultants except the first resultant.

32. The system of claim 31 wherein the invertible hash function is an invertible geometric hash function and the invertible hash function complement is an invertible geometric hash function complement.

33. The system of claim 31 wherein each of the plurality of components includes thirty-two bits.

34. The system of claim 31 wherein the final component includes a plurality of bits used to pad the final component to the particular number of bits.

35. The system of claim 31 wherein the invertible hash function and the invertible hash function complement providing means further includes:

means for applying the invertible hash function and the invertible hash function complement to each of the plurality of components.

36. The system of claim 31 further comprising:

means for providing a permutation of at least one component of the plurality of components.

37. The method of claim 2 wherein the invertible hash function applying step (c) further includes the steps of:

(c1) dividing the at least the first resultant into a plurality of subsets of equal length, the plurality of subsets including a first primary subset and a second primary subset;

(c2) selecting the first primary subset and the second primary subset of the plurality of subsets;

(c3) dividing a space defined by the first primary subset and the second primary subset into a plurality of regions including an origin region;

(c4) flipping the first primary subset and the second primary subset into the origin region;

(c5) concatenating a portion of the first primary subset and the second primary subset after flipping with most significant bits of a remaining portion of the plurality of subsets to provide the hash; and (c6) determining the complement of the hash using the remaining portion of the plurality of subsets.

38. The method of claim 8 wherein the invertible hash function applying step (b) further includes the steps of:

(b1) dividing the at least the first component into a plurality of subsets of equal length, the plurality of subsets including a first primary subset and a second primary subset;

(b2) selecting the first primary subset and the second primary subset of the plurality of subsets;

(b3) dividing a space defined by the first primary subset and the second primary subset into a plurality of regions including an origin region;

(b4) flipping the first primary subset and the second primary subset into the origin region;

(b5) concatenating a portion of the first primary subset and the second primary subset after flipping with most significant bits of a remaining portion of the plurality of subsets to provide the hash; and (b6) determining the complement of the hash using the remaining portion of the plurality of subsets.

39. The computer-readable medium of claim 8 wherein the invertible hash function applying instructions (c) further includes instructions for:

(c1) dividing the at least the first resultant into a plurality of subsets of equal length, the plurality of subsets including a first primary subset and a second primary subset;

(c2) selecting the first primary subset and the second primary subset of the plurality of subsets;

(c3) dividing a space defined by the first primary subset and the second primary subset into a plurality of regions including an origin region; (c4) flipping the first primary subset and the second primary subset into the origin region;

(c5) concatenating a portion of the first primary subset and the second primary subset after flipping with most significant bits of a remaining portion of the plurality of subsets to provide the hash; and (c6) determining the complement of the hash using the remaining portion of the plurality of subsets.

40. The computer-readable medium of claim 20 wherein the invertible hash function applying instructions (b) further includes instructions for:

(b1) dividing the at least the first component into a plurality of subsets of equal length, the plurality of subsets including a first primary subset and a second primary subset;

(b2) selecting the first primary subset and the second primary subset of the plurality of subsets;

(b3) dividing a space defined by the first primary subset and the second primary subset into a plurality of regions including an origin region;

(b4) flipping the first primary subset and the second primary subset into the origin region;

(b5) concatenating a portion of the first primary subset and the second primary subset after flipping with most significant bits of a remaining portion of the plurality of subsets to provide the hash; and (b6) determining the complement of the hash using the remaining portion of the plurality of subsets.

41. The system of claim 26 wherein the invertible hash function applying means further divide the at least the first resultant into a plurality of subsets of equal length, the plurality of subsets including a first primary subset and a second primary subset; select the first primary subset and the second primary subset of the plurality of subsets; divide a space defined by the first primary subset and the second primary subset into a plurality of regions including an origin region; flip the first primary subset and the second primary subset into the origin region; concatenate a portion of the first primary subset and the second primary subset after flipping with most significant bits of a remaining portion of the plurality of subsets to provide the hash; and determine the complement of the hash using the remaining portion of the plurality of subsets.

42. The system of claim 32 wherein the invertible hash function applying means further divide the at least the first component into a plurality of subsets of equal length, the plurality of subsets including a first primary subset and a second primary subset;

select the first primary subset and the second primary subset of the plurality of subsets; divide a space defined by the first primary subset and the second primary subset into a plurality of regions including an origin region; flip the first primary subset and the second primary subset into the origin region; and concatenate a portion of the first primary subset and the second primary subset after flipping with most significant bits of a remaining portion of the plurality of subsets to provide the hash; and determine the complement of the hash using the remaining portion of the plurality of subsets.

* * * * *